(12) United States Patent
Yoshida et al.

(10) Patent No.: US 7,460,120 B2
(45) Date of Patent: Dec. 2, 2008

(54) MAP DISPLAY APPARATUS

(75) Inventors: Tadashi Yoshida, Osaka (JP); Hitoshi Araki, Hirakata (JP); Keiichi Senda, Kyoto (JP); Masato Yuda, Osaka (JP); Yoshiteru Kawasaki, Toyonaka (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 10/984,840

(22) Filed: Nov. 10, 2004

(65) Prior Publication Data

US 2005/0104881 A1 May 19, 2005

(30) Foreign Application Priority Data

Nov. 13, 2003 (JP) ............... 2003-384313

(51) Int. Cl.
*G06T 15/00* (2006.01)
*G06T 15/10* (2006.01)
*G06T 1/00* (2006.01)
*G06F 17/00* (2006.01)
*G06G 5/00* (2006.01)
*G08G 1/123* (2006.01)
*G01C 21/30* (2006.01)

(52) U.S. Cl. ............... 345/427; 345/630; 345/651; 340/995.1; 701/208

(58) Field of Classification Search ............... 345/630, 345/651, 427; 701/208; 340/995.1
See application file for complete search history.

(56) References Cited

U.S. PATENT DOCUMENTS 3,576,427 A * 4/1971 Taylor, Jr. ............... 358/1.3

(Continued)

FOREIGN PATENT DOCUMENTS

DE 100 23 160 11/2000

(Continued)

OTHER PUBLICATIONS

Suomela, Riku; Roimela, Kimmo; Lehikoinen, Juha; "The evolution of perspective view in WalkMap," Oct. 2003, Personal and Ubiquitous Computing, vol. 7, Issue 5, pp. 249-262.*

(Continued)

*Primary Examiner*—Kee M Tung
*Assistant Examiner*—Crystal Murdoch
(74) *Attorney, Agent, or Firm*—Wenderoth, Lind & Ponack, L.L.P.

(57) ABSTRACT

A map display apparatus includes a view transformation matrix generation unit which generates a view transformation matrix, including four rows and four columns, for transforming a global coordinate of a three-dimensional object into a view coordinate system; a view transformation matrix change unit which (i) changes, to 0, (a) the value of the first row in the second column and (b) the value of the third row in the second column in the view transformation matrix, in the case where the coordinate transformation is executed by multiplying a coordinate with the view transformation matrix from the left side of the coordinate, and (ii) changes, to 0, (a) the value of the second row in the first column and (b) the value of the second row in the third column in the view transformation matrix, in the case where the coordinate transformation is executed by multiplying the coordinate with the view transformation matrix from the right side of the coordinate; and a view transformation unit which transforms the global coordinate into the view coordinate system using the changed view transformation matrix.

7 Claims, 10 Drawing Sheets

U.S. PATENT DOCUMENTS

| | | | | |
|---|---|---|---|---|
| 5,101,475 A * | 3/1992 | Kaufman et al. | ............ | 345/424 |
| 5,495,576 A * | 2/1996 | Ritchey | ............ | 345/420 |
| 5,509,112 A * | 4/1996 | Doi et al. | ............ | 345/440 |
| 5,616,031 A * | 4/1997 | Logg | ............ | 434/38 |
| 5,847,711 A * | 12/1998 | Kaufman et al. | ............ | 345/424 |
| 5,913,918 A * | 6/1999 | Nakano et al. | ............ | 701/208 |
| 5,986,662 A * | 11/1999 | Argiro et al. | ............ | 345/424 |
| 6,072,497 A * | 6/2000 | Lichtenbelt et al. | ......... | 345/424 |
| 6,222,551 B1 * | 4/2001 | Schneider et al. | ............ | 345/419 |
| 6,278,460 B1 * | 8/2001 | Myers et al. | ............ | 345/424 |
| 6,285,317 B1 * | 9/2001 | Ong | ............ | 342/357.13 |
| 6,292,745 B1 * | 9/2001 | Robare et al. | ............ | 701/208 |
| 6,452,544 B1 * | 9/2002 | Hakala et al. | ............ | 342/357.13 |
| 6,573,893 B1 * | 6/2003 | Naqvi et al. | ............ | 345/424 |
| 6,591,190 B2 * | 7/2003 | Nishida et al. | ............ | 701/211 |
| 6,628,279 B1 * | 9/2003 | Schell et al. | ............ | 345/420 |
| 6,710,774 B1 | 3/2004 | Kawasaki et al. | | |
| 6,798,409 B2 * | 9/2004 | Thomas et al. | ............ | 345/427 |
| 2001/0020211 A1 * | 9/2001 | Takayama et al. | ............ | 701/200 |
| 2001/0026276 A1 * | 10/2001 | Sakamoto et al. | ............ | 345/473 |
| 2001/0037177 A1 * | 11/2001 | Nishida et al. | ............ | 701/211 |
| 2002/0041717 A1 * | 4/2002 | Murata et al. | ............ | 382/275 |
| 2002/0062360 A1 * | 5/2002 | Ishiguro | ............ | 709/219 |
| 2002/0085014 A1 * | 7/2002 | Yuda et al. | ............ | 345/582 |
| 2003/0023412 A1 * | 1/2003 | Rappaport et al. | ............ | 703/1 |
| 2003/0154021 A1 * | 8/2003 | Delling et al. | ............ | 701/208 |
| 2003/0214502 A1 * | 11/2003 | Park et al. | ............ | 345/420 |
| 2004/0125103 A1 * | 7/2004 | Kaufman et al. | ............ | 345/419 |
| 2004/0176908 A1 * | 9/2004 | Senda et al. | ............ | 701/211 |
| 2005/0004749 A1 * | 1/2005 | Park | ............ | 701/200 |
| 2005/0159886 A1 * | 7/2005 | Kim | ............ | 701/208 |
| 2005/0179688 A1 * | 8/2005 | Chernichenko et al. | ..... | 345/427 |
| 2006/0078224 A1 * | 4/2006 | Hirosawa | ............ | 382/284 |
| 2007/0206008 A1 * | 9/2007 | Kaufman et al. | ............ | 345/424 |

FOREIGN PATENT DOCUMENTS

| | | |
|---|---|---|
| EP | 1 037 188 | 9/2000 |
| EP | 1 189 030 | 3/2002 |
| JP | 9-281889 | 10/1997 |

OTHER PUBLICATIONS

Foley, van Dam, Feiner, Hughes; "Computer Graphics: Principles and Practice," 1996, Addison-Wesley Publishing Company, Inc., Second Edition, pp. 210-226 and 229-256.*

Carlbom, Ingrid; Paciorek, Joseph; "Planar Geometric Projections and Viewing Transformation;" Dec. 1978; ACM Computing Surveys, vol. 10, No. 4; pp. 465-502.*

* cited by examiner

Local coordinate system

Global coordinate system

View coordinate system

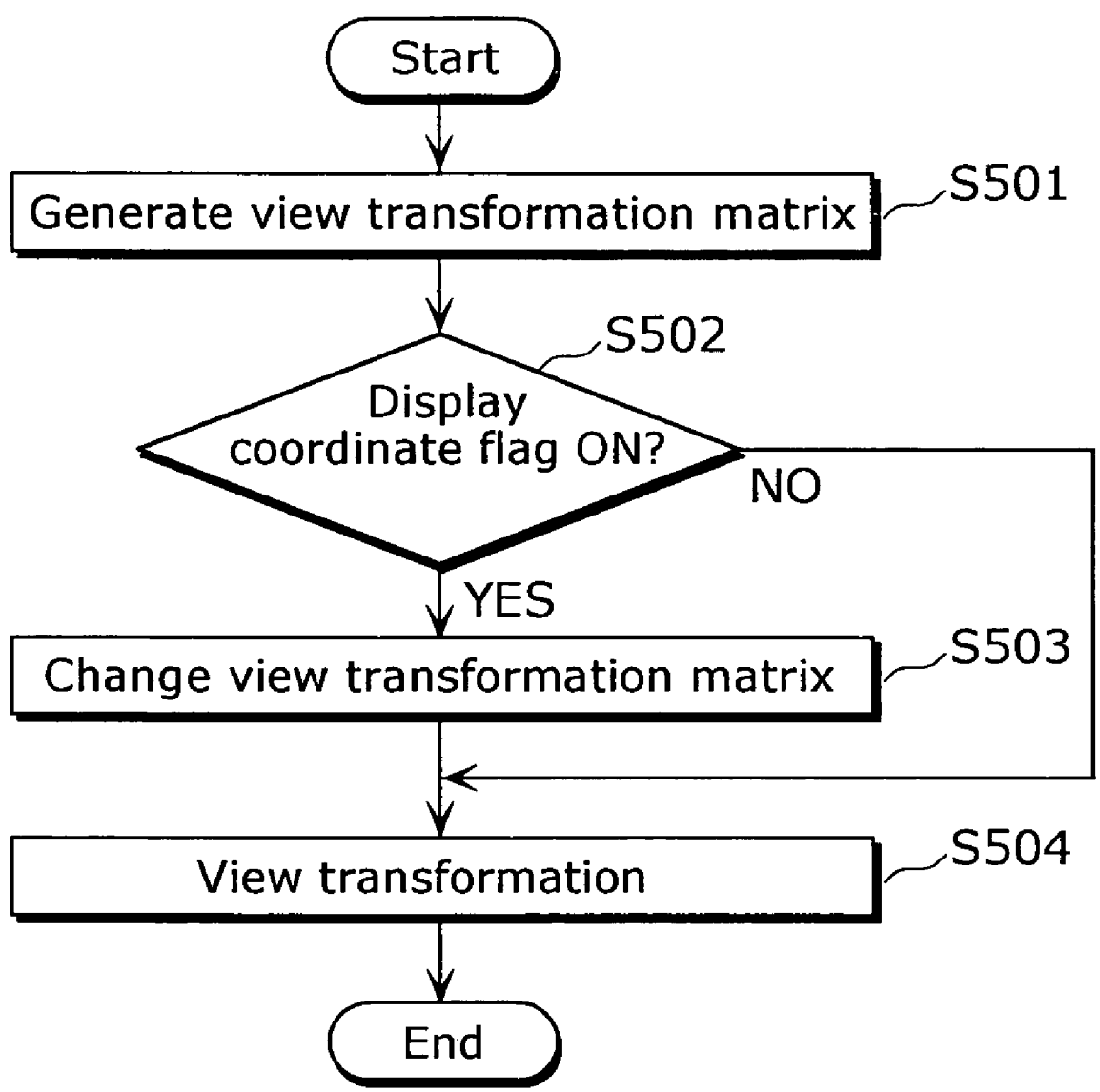

MAP DISPLAY APPARATUS

BACKGROUND OF THE INVENTION (1) Field of the Invention

The present invention relates to the map display apparatus which displays a map on a screen, in particular, to a map display apparatus which generates a three-dimensional image from the electronized map data, and displays a map on the screen.

(2) Description of the Related Art

Conventionally, a map display apparatus which generates and displays a three-dimensional image from electronized map data has been used, and has been applied to, for example, a car navigation apparatus, a map display software for personal computer, and the like (for example, refer to Japanese Laid-Open Patent publication No. H9-281889).

In the above mentioned map display apparatus, in order to display, on a two-dimensional screen, an object such as a building and a high bridge which have been defined in a three-dimensional space, a three-dimensional coordinate is transformed into a two-dimensional coordinate. Here, the coordinate system, as shown in FIG. 1A, in which the center of each three-dimensional object is the origin point is called a "local coordinate system". The coordinate space, as shown in FIG. 1B, which includes all of the above mentioned objects is called a "global coordinate system". The coordinate space, as shown in FIG. 1C, which can be viewed when facing a certain direction (called z axis direction) from a certain point (called the origin point) of the global coordinate system is called a "view coordinate system". The coordinate system is called a "screen coordinate system", the coordinate system being two-dimensionally perspective projected so as to display, on a screen, the part included in the field of view from the viewpoint in the view coordinate system. Also, the transformation from the local coordinate system into the global coordinate system is called a "local-to-global transformation". The transformation from the global coordinate system into the view coordinate system is called a "view transformation". The transformation from the view coordinate system into the screen coordinate system is called a "projection-transformation". The transformation for adjusting the projection-transformed coordinate to the proper size for the final display area on the screen of the map display apparatus is called a "view-port-transformation". In other words, in the map display apparatus, in order to display the object defined in the three-dimensional space, on the two-dimensional screen of the map display apparatus, the transformation is executed according to need, from the coordinate system for which each object is defined into the screen coordinate system.

When a three-dimensional space is displayed on a two-dimensional screen, in the same way as actually viewed with human eyes, a close object is displayed large, and a far object is displayed small. FIG. 2A, FIG. 2B and FIG. 2C are schematic diagrams for explaining perspective distortion: FIG. 2A is a side view of an object (building); FIG. 2B is a front view of the object (building); and FIG. 2C is a front view of the whole screen. For example, as shown in FIG. 2A, in the case where the top part of the building is close (distance "a") to the viewpoint position (origin point), and the bottom part of the building is far (distance "b") from the viewpoint position (origin point), as shown in FIG. 2B, the top part becomes large (distance "c"), and the bottom part becomes small (distance "d"). Thus, depending on the perspective from the viewpoint, so-called perspective distortion occurs, and as shown in FIG. 2B, lean occurs in the border line of the vertical direction of the building (vertical direction of the screen). The farther a building exists from the view line, the larger the effect of the above mentioned perspective distortion becomes.

In the above mentioned conventional map display apparatus, as shown in FIG. 2C, the position of the fixation point W in the view coordinate system often exists around the screen center. The closer to the end of the screen a building is rendered (in particular, rendered on the front side), the more the building deviates from the view line. Due to the effect of the perspective distortion, the building cannot be rendered straight on the "y" axis (vertical direction of the screen) of the screen coordinate, and is leaned. Thus, in an apparatus such as a car navigation apparatus which uses a low resolution display, regarding the building on the screen end of the display apparatus, as the border line of the building in the vertical direction is leaned, as shown in FIG. 3A, jaggies appear, and a straight border line in the vertical direction as shown in FIG. 3C cannot be displayed beautifully.

As counter measures for the above mentioned problem of jaggies, first, increasing the display resolution is conceivable. However, to achieve this, improved performance of the hardware is necessary. Also, as another counter measure, executing an anti-aliasing process is conceivable. This anti-aliasing process is a process to complement, using half tone, the space between the border line in the vertical direction of the leaned building and the background, and to make the border line appear smooth. However, to achieve this, improved processing performance of CPU is necessary. Thus, in the status quo, it is difficult to use the above mentioned counter measures for the apparatus such as a car navigation apparatus which has little hardware resource.

By the way, without executing coordinate transformations for all of the vertexes forming the building as described above, a method for artificially generating a solid by providing height to the vertexes forming the bottom plane of the building is conceivable. According to the above mentioned method, for example, in the case of a solid building, without executing coordinate transformations for the eight vertexes A to H forming the building as shown in FIG. 4A, a three-dimensional image is rendered by providing the same height to the four vertexes I to L and artificially generating a solid. Thus, the building is rendered straight on the "y" axis (vertical direction of the screen) of the screen coordinate. However, for example, when the viewpoint is set closer to the building, in the case of the method using the coordinate transformation, the building is coordinate transformed into the form viewed from the viewpoint, and the top plane of the building cannot be viewed as shown in FIG. 5A. On the other hand, in the case of the method for artificially generating a solid, as shown in FIG. 5B, although the viewpoint is looking up the building, the top plane of the building can be viewed, and an unnatural image is rendered.

SUMMARY OF THE INVENTION

The object of the present invention, in view of the above mentioned problems, is to provide a map display apparatus such as a car navigation apparatus with little hardware resource which can (i) generate a three-dimensional image using a coordinate transformation, and (ii) display a building which is a three-dimensional object straight in the screen vertical direction clearly and beautifully.

In order to achieve the above mentioned object, the map display apparatus according to the present invention displays a three-dimensional map on a screen, based on map data including data regarding a three-dimensional object, wherein the map data includes a display correction flag indicating whether or not to execute a correction so that a line of the three-dimensional object in vertical direction should be vertical, when the three-dimensional object is displayed on the screen, and the map display apparatus comprises a correction unit operable to execute a correction, in the case where the display correction flag indicates that the correction should be executed, so that the line of the three-dimensional object in vertical direction should be vertical when the three-dimensional object is displayed on the screen.

Thus, a correction can be executed on each three-dimensional object according to need, and only the three-dimensional object which needs to be displayed straight can be displayed straight in the screen vertical direction.

The map display apparatus further comprises: an object generation unit operable to execute a generation process of the three-dimensional object by specifying a local coordinate of each vertex of the three-dimensional object, based on the map data; a local-to-global transformation unit operable to transform the local coordinate of the three-dimensional object into a global coordinate; a view transformation matrix generation unit operable to (i) specify a view coordinate of a viewpoint on the global coordinate, and (ii) generate a view transformation matrix for transforming the global coordinate into a view coordinate system whose origin point is the view coordinate; a view transformation unit operable to transform the global coordinate into the view coordinate system, using the view transformation matrix; a rendering unit operable to (i) projection-transform, the coordinate which has been transformed into the view coordinate system, into a screen coordinate system which is a two-dimensional coordinate system, and (ii) adjust the projection-transformed coordinate to a final display area of a proper size on the screen, wherein the correction unit changes the view transformation matrix generated by the view transformation matrix generation unit so that the line of the three-dimensional object in a vertical direction should be vertical when the three-dimensional object is displayed on the screen, and the view transformation unit transforms the global coordinate into the view coordinate system, using the view transformation matrix changed by the correction unit.

Here, it is desirable that the correction unit changes the view transformation matrix so as to exclude the effect, on the value of "x" coordinate and the value of "z" coordinate which are transformed by the view transformation, of the value of "y" coordinate which is the vertical direction in the global coordinate system.

Also, it is desirable that the view transformation matrix is a transformation matrix including four rows and four columns, and the correction unit changes, to 0, (i) the value of the first row in second column and (ii) the value of the third row in second column in the view transformation matrix, in the case where a coordinate transformation is executed by multiplying a coordinate with the view transformation matrix from left side of the coordinate. It is desirable that the correction unit changes, to 0, (i) the value of the second row in first column and (ii) the value of the second row in third column in the view transformation matrix, in the case where a coordinate transformation is executed by multiplying a coordinate with the view transformation matrix from the right side of the coordinate.

The reason why a perspective distortion occurs is because after a view transformation and a projection-transformation are executed on (the vertical line of) a building which is rendered straight in direction of "y" axis in a global coordinate system (where the value of "x" and the value of "z" are constant regardless of the value of "y"), the value of "x" coordinate changes due to the value of "y" coordinate in the global coordinate system. Thus, one solution is to prevent the value of "x" coordinate after the final transformation from being affected by the value of "y" coordinate in the global coordinate. However, if the projection-transformation is changed, the projection-transformation does not function properly. Also, in the projection-transformation, the value of "x" coordinate is affected by the value of "z" coordinate, thereby the value of "z" coordinate should not be affected by the value of "y" coordinate. Therefore, it is necessary to prevent the value of "x" coordinate and the value of "z" coordinate which are transformed by the view transformation from being affected by the value of "y" coordinate in the global coordinate system.

Thus, by changing the view transformation matrix generated as described above, it is possible to (i) exclude the effect of the "y" value in the vertical direction of the global coordinate system on the value of "x" coordinate and the value of "z" coordinate transformed by the view transformation, and (ii) display a three-dimensional object straight in the vertical direction of the screen.

The map display apparatus further comprises a selection unit operable to select one of (i) "always execute a correction" in the correction unit, (ii) "execute a correction based on the display correction flag" in the correction unit, and (iii) "never execute a correction" in the correction unit, wherein in the case where (i) "always execute a correction" is selected by the selection unit, the correction unit executes the correction on all of the three-dimensional objects, regardless of the display correction flag, in the case where (ii) "execute a correction based on the display correction flag" is selected by the selection unit, the correction unit executes the correction on the three-dimensional object based on the display correction flag, and in the case where (iii) "never execute a correction" is selected by the selection unit, the correction unit does not execute the correction on the three-dimensional object.

Thus, it is possible to select, according to need, from among (i) a display including a regular perspective distortion, (ii) a display which displays each three-dimensional object straight in the vertical direction of the screen based on the display correction flag, and (iii) a display which displays all of the three-dimensional objects straight in the vertical direction of the screen.

The map display system according to the present invention is a map display system comprising: a server apparatus which generates three-dimensional map image data based on map data including data regarding a three-dimensional object; and a terminal apparatus which communicates with the server apparatus and displays a three-dimensional map on a screen, wherein the map data includes a display correction flag indicating whether or not to execute a correction so that a line of the three-dimensional object in a vertical direction should be vertical, when the three-dimensional object is displayed on the screen, the server apparatus includes: a correction unit operable to execute a correction, in the case where the display correction flag indicates that the correction should be executed, so that the line of the three-dimensional object in the vertical direction should be vertical when the three-dimensional object is displayed on the screen; and a communication unit operable to transmit the three-dimensional map image data to the terminal apparatus, and the terminal apparatus includes: a communication unit operable to receive the three-dimensional map image data transmitted from the server apparatus; and a display unit operable to adjust the received three-dimensional map image data to a final display area of a proper size, and display the data on the screen.

Thus, in the case where a three-dimensional map is displayed on the screen of a terminal apparatus, such as a cellular phone with little hardware resource, which communicates with a server apparatus, it is possible to display only the three-dimensional objects straight in the vertical direction, the three-dimensional objects needing to be displayed straight.

The present invention cannot only be realized as the map display apparatus and the map display system as described above, but also as (i) a map display method which has the characteristic units, as steps, comprised in the above mentioned map display apparatus and map display system, and (ii) a program which causes a computer to execute the above mentioned steps. Needless to say, such program can be distributed via a recording medium such as a CD-ROM and a transmission medium such as Internet.

As is evident from the above mentioned explanations, according to the map display apparatus of the present invention, (i) a correction can be executed on a three-dimensional object according to need, (ii) only the buildings can be displayed straight in the screen vertical direction, the buildings being the three-dimensional objects which need to be displayed straight, and (iii) jaggies can be prevented from appearing so as to enable a clear and beautiful display.

Consequently, according to the present invention, even in an apparatus with little hardware resource, jaggies can be prevented from appearing, and a clear and beautiful display can be achieved. Therefore, the present invention has an extremely high practical value in this day when a three-dimensional map display on a screen in an apparatus such as a car navigation apparatus is widely used.

FURTHER INFORMATION ABOUT TECHNICAL BACKGROUND TO THIS APPLICATION

The disclosure of Japanese Patent Application No. 2003-384313 filed on Nov. 13, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1A shows a local coordinate system; FIG. 1B shows a global coordinate system; FIG. 1C shows a view coordinate system;

FIG. 2A shows a side view of a three-dimensional object (building); FIG. 2B shows a front view of the three-dimensional object (building); FIG. 2C shows a front view of the whole screen;

FIG. 3A shows the state where the border line is leaned and jaggies appear; FIG. 3B shows the state where an anti-aliasing process is executed; FIG. 3C shows the state where the border line is straight;

FIG. 4A shows the method for executing coordinate transformations on all of the vertexes forming the three-dimensional object; FIG. 4B shows the method for artificially generating a solid by providing height to the vertexes forming the bottom plane of the three-dimensional object;

FIG. 5A shows the method for executing coordinate transformations on all of the vertexes forming a three-dimensional object; FIG. 5B shows the method for artificially generating a solid by providing height to the vertexes forming the bottom plane of the three dimensional object; and FIG. 11 is a flow chart showing the procedures of a change process of a view transformation matrix and a transformation process from a global coordinate system into a view coordinate system in the case of using a display correction flag in the map display apparatus according to the second embodiment of the present invention.

DESCRIPTION OF THE PREFERRED EMBODIMENT(S)

Hereinafter, the map display apparatus according to the present invention will be specifically explained using the drawings. As examples of the map display apparatus according to the present invention, there are a car navigation apparatus, a cellular phone, a digital TV, a Personal Computer (PC), a Personal Digital Assistant (PDA), and the like respectively comprising a three-dimensional map display function. Also, the above mentioned examples are the apparatuses comprising a screen which can display a map.

First Embodiment

Figure 6:
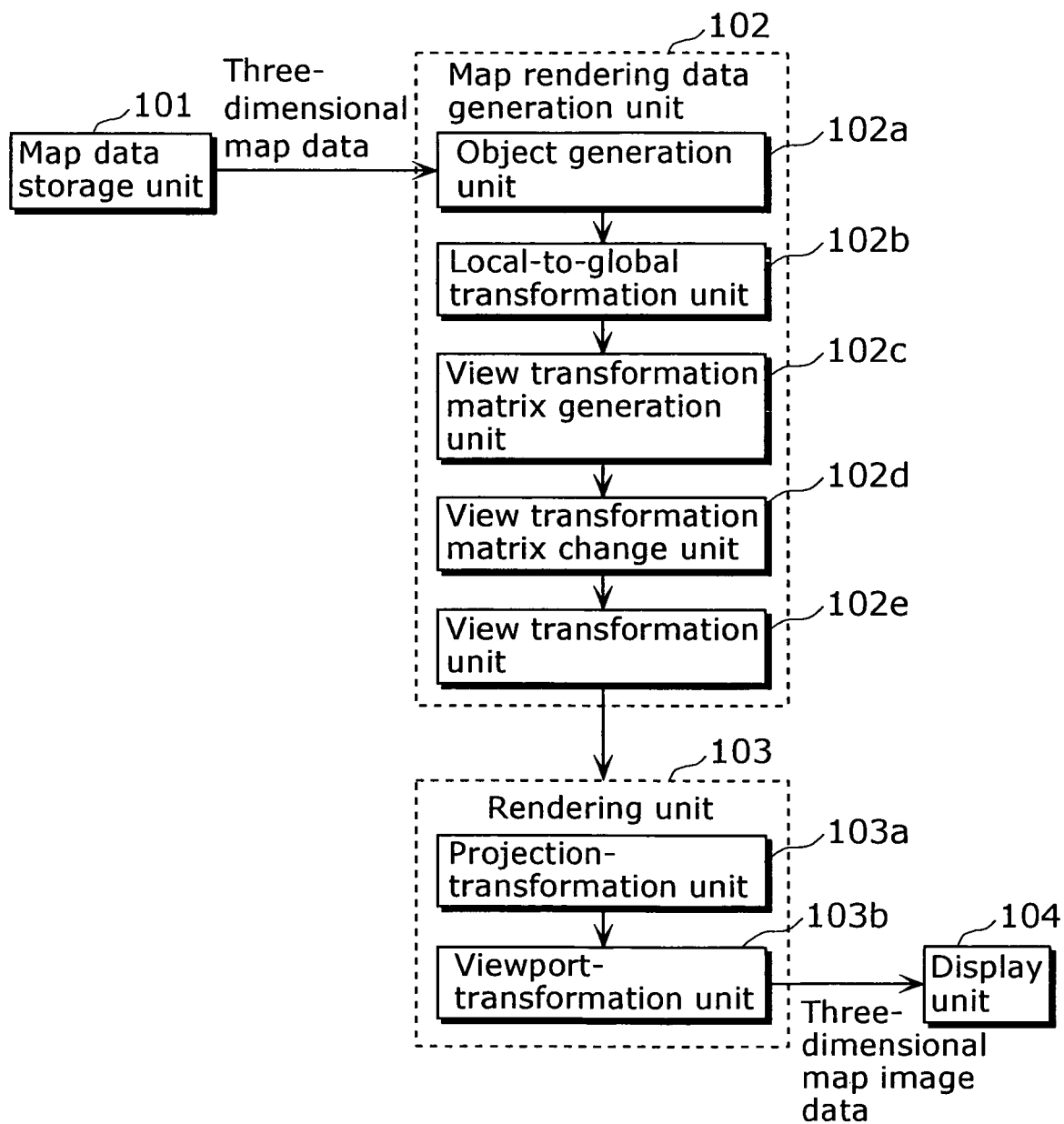
FIG. 6 is a block diagram showing a part of the configuration of the map display apparatus according to the first embodiment of the present invention.

FIG. 6 is block diagram showing a part of the configuration of the map display apparatus according to the first embodiment of the present invention.

The map display apparatus generates a three-dimensional image from the electronic map data, and displays the map on the screen. The map display apparatus comprises: a map data storage unit 101 for storing map data such as location information and height information of the object displayed on the screen; a map rendering data generation unit 102 for (i) acquiring map data from the map data storage unit 101 and (ii) generating map rendering data such as form data of the object; a rendering unit 103 for (i) executing a rendering process on the map rendering data generated by the map data generation unit and (ii) generating an image to be displayed on the screen; and a display unit 104 for displaying the image generated by the rendering unit 103 on the actual screen such as a display.

The map data storage unit 101 stores map data such as location information according to the latitude and longitude of the roads, blocks and geography which are displayed on the screen, height information, attribute information (for example, what the object is, color and the like), and three-dimensional building data for indicating the three-dimensional object to be displayed on the screen. The three-dimensional building data includes: height H of a building which is a three-dimensional object; vertex number N of a polygonal column shape forming a border rectangle of the building; each vertex coordinate Pi (i=1–N); attributes; and the like. Here, each vertex coordinate Pi of the polygonal column shape of the building is a two-dimensional coordinate. Also, as the attributes for rendering the polygonal column shape of the building, there are: color; texture which is an image attached to a plane; plane information such as index forming a plane; information indicating the type of building; and the like.

The map rendering data generation unit 102, based on the map data stored in the map data storage unit 101, generates (i) form data including (a) the coordinate of element vertexes forming the plane, line and dot of a three-dimensional object and (b) connection information of the element vertexes and (ii) map rendering data including rendering information such as (a) color value for rendering an object and (b) texture image. The map rendering data generation unit 102 includes: an object generation unit 102a; a local-to-global transformation unit 102b; a view transformation matrix generation unit 102c; a view transformation matrix change unit 102d; and a view transformation unit 102e.

The object generation unit 102a executes a generation process of a three-dimensional object which is a building and the like displayed on the screen using the map data such as the latitude and longitude, the height information and the building type. In the case where the three-dimensional object displayed on the screen is a building of a polygonal column shape, the object generation unit 102a (i) extracts the three-dimensional building data stored in the map data storage unit 101 and (ii) calculates "2×N" (N is a natural number) number of three-dimensional vertex coordinates Qi (i=1–N) forming a polygonal column shape of the building and Ri (i=1–N). Here, Qi is a vertex coordinate forming the bottom plane of the flat plane with the polygonal column height of 0. Each vertex coordinate of the three-dimensional object calculated in the object generation unit 102a is in the local coordinate system which is a coordinate system whose center is the three-dimensional object.

In addition, the object generation unit 102a calculates the arrangement of vertex numbers forming N number of side planes and one top plane. The color and texture of each plane which are rendering information are assigned depending on the normal direction of a plane. For example, as for the color of an object, the irradiation amount of the light on a plane can be calculated using the light source position and plane normal line, and brightness of the color to be rendered can be calculated in real time. In the case where the rendering information is included in the three-dimensional building data in advance, the object generation unit 102a assigns the color and texture of each plane based on the three-dimensional building data.

The local-to-global transformation unit 102b, on a three-dimensional object, executes a process of transforming a local coordinate system which centers the three-dimensional object into an even larger global coordinate system, using a local-to-global transformation matrix of four rows and four columns.

The view transformation matrix generation unit 102c generates a view transformation matrix which transforms the global coordinate system into a view coordinate system in which (i) the view coordinate is the origin point, (ii) the view direction is the depth direction ("z" axis), and (iii) the vertical rising direction is the height direction ("y" axis).

The view transformation matrix change unit 102d forms a correction means, and changes a view transformation matrix of four rows and four columns for transforming, into a view coordinate system, the coordinate of the global coordinate system generated in the view transformation matrix generation unit 102c. In other words, in the case where the coordinate transformation is executed from the left side of the coordinate by multiplying a coordinate with the view transformation matrix, the view transformation matrix change unit 102d changes, to 0, (i) the term regarding the "y" coordinate of the first row regarding the transformation of the view transformation matrix into "x" (the term of the second column in the first row) and (ii) the term regarding the "y" coordinate of the third row regarding the transformation of the view transformation matrix into "z" (the term of the second column in the third row). On the other hand, in the case where the coordinate transformation is executed from the right side of the coordinate by multiplying a coordinate with the view transformation matrix, the view transformation matrix change unit 102c changes, to 0, (i) the term regarding the "y" coordinate of the first column regarding the transformation of the view transformation matrix into "x" (the term of the first column in the second row) and (ii) the term regarding the "y" coordinate of the third column regarding the transformation of the view transformation matrix into "z" (the term of the third column in the second row).

The view transformation unit 102e executes a process of transforming, into a view coordinate system, each vertex coordinate of the three-dimensional object on a global coordinate system, using the view transformation matrix inputted from the view transformation matrix change unit 102d. In other words, the view transformation unit 102e, using the changed view transformation matrix, transforms, into the three-dimensional coordinate T' (X',Y',Z',1) of the view coordinate system, all of the vertex coordinates T (X,Y,Z,1) forming the form data included in the map rendering data. The component of the fourth row of both the vertex coordinate T (X,Y,Z,1) in time of the transformation and the vertex coordinate T' (X',Y',Z',1) after the transformation is 1. This is intended to enable the effect from the parallel translation component of the form data change matrix. Also, the view coordinate is one point in the global coordinate system, and set based on, for example, a user's direction, a current position (self-vehicle position) of a mobile vehicle which has a map display apparatus, and the like.

The rendering unit 103, on the three-dimensional map rendering data processed in the map rendering data generation unit 102, (i) executes a rendering process so as to projection-transform on the actual two-dimensional screen, and (ii) generates an image to be displayed on the screen. The rendering unit 103 includes a projection-transformation unit 103a and a viewport-transformation unit 103b.

The projection-transformation unit 103a (i) sets a projection-transformation matrix for each vertex coordinate of the three-dimensional object in the view coordinate system transformed in the view transformation unit 102e, and (ii) executes a projection-transformation process so as to project each vertex coordinate of the three-dimensional building object onto the two-dimensional screen.

Figure 8:
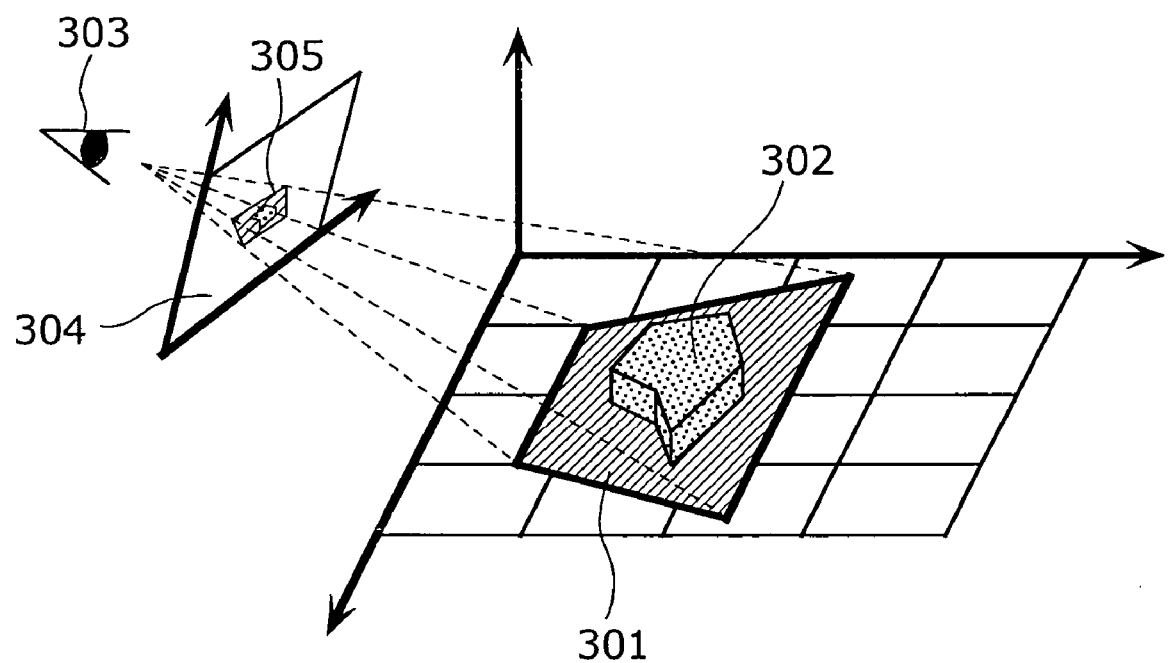
FIG. 8 is an illustration of a projection-transformation process in a projection-transformation unit.

FIG. 8 is an illustration of the projection-transformation process in the projection-transformation unit 103a. As shown in FIG. 8, a rendering area 301 and map rendering data 302 are displayed in the three-dimensional coordinate system on the global coordinate.

The projection-transformation unit 103a determines a projection-transformation matrix of four rows and four columns determined by a viewpoint 303 which is arranged in the position corresponding to the view coordinate, and a view vector. The projection-transformation unit 103a (i) executes a matrix transformation of the three-dimensional vertex coordinate of a three-dimensional building object and the like, using the projection-transformation matrix, and (ii) transforms the three-dimensional vertex coordinate into the coordinate system of a two-dimensional screen 304. As a result, which position of the screen each coordinate of the three-dimensional building object should be arranged is determined, and a projected image 305 is displayed on the screen 304 of the map display apparatus. In the projection-transformation, generally an object close to the viewpoint 303 is rendered large, and an object far from the viewpoint is rendered small.

Also, the projection-transformation unit 103a executes a filling process on each plane of a three-dimensional object, based on the vertex coordinate data on which the projection-transformation has been executed. In the filling process, the projection-transformation unit 104a may execute a hidden-surface removal process, based on the information regarding the depth from the viewpoint, called Z value calculated by the projection transformation process. The hidden-surface removal process is a process to detect an object and a plane which cannot be viewed from the viewpoint 303, and execute control not to render the above mentioned object and plane. As the method for realizing the hidden-surface removal process, there are (i) a Z buffer method for providing depth information to each pixel unit of the screen, judging the depth information in time of rendering for each pixel, and rendering only the front side, (ii) a Z sort method for permutating each plane to be rendered in the order of the depth, and sequentially rendering from the farthest plane to the viewpoint, and the like.

The viewport-transformation unit 103b executes matrix transformation of each vertex coordinate of a three-dimensional object, using a viewport-transformation matrix for adjusting, to a proper size of the final display area, the image which has been projection-transformed in the projection-transformation unit 103a. Here, the viewport indicates a square-shaped area which has a width and height of an area that is smaller than the screen, and the viewport-transformation unit 103b changes the viewport-transformed coordinate into a screen coordinate (Sx, Sy) which is a coordinate on the two-dimensional screen.

The display unit 104 acquires a screen coordinate (Sx, Sy) determined by the viewport-transformation unit 103b, and displays rendering data on the display which is the actual screen of the map display apparatus.

Figure 7:
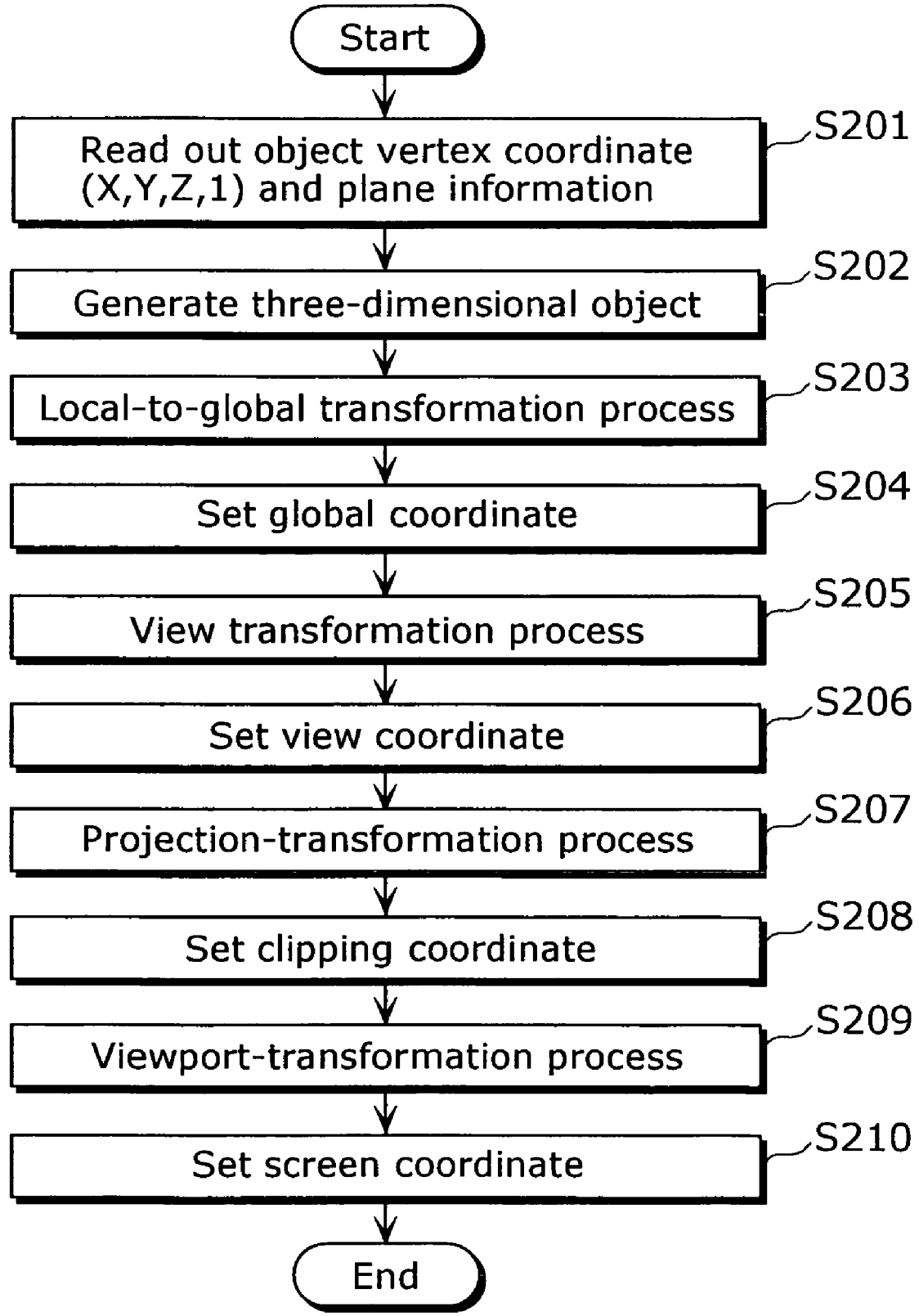
FIG. 7 is a flow chart showing the procedures of the display process of the three-dimensional object displayed on the screen of the map display apparatus according to the first embodiment of the present invention.

The display process procedures of a three-dimensional object in the map display apparatus configured as described above will be explained. FIG. 7 is a flow chart for calculating a coordinate of the three-dimensional object displayed on the screen of the map display apparatus according to the present embodiment.

First, the object generation unit 102a reads out plane information including: a vertex coordinate (for example, (X, Y, height)) which is map data of an object stored in the map data storage unit 101; color data; texture data; index forming plane data; and the like (S201). The object generation unit 102a (i) extracts (a) location information such as latitude and longitude of each vertex in the rectangular area of a building generated on the screen and (b) height information of each vertex which have been acquired from the map data storage unit 101, (ii) provides the location information and height information to each vertex of the rectangular area of the building, and (iii) generates a three-dimensional building object displayed as polygonal column data (S202). Also, the object generation unit 102a sets the vertex color of the three-dimensional building object based on the map data.

Next, the local-to-global transformation unit 102b (i) sets a local-to-global transformation matrix, (ii) matrix-transforms the local coordinate (X,Y,Z,1) of each vertex acquired from the object generation unit 102a, using the local-to-global transformation matrix, and (iii) sets the global coordinate (X',Y',Z', 1) (S203 and S204).

Then, the view transformation matrix generation unit 102c generates a view transformation matrix for transforming a global coordinate system into a view coordinate system in which (i) the view coordinate is the origin point, (ii) the view direction is the depth direction ("z" axis), and (iii) the vertical rising direction is the height direction ("y" axis). Next, in the case where the coordinate transformation is executed by multiplying a coordinate with the view transformation matrix from the left side of the coordinate, the view transformation matrix change unit 102d changes, to 0, (i) the value of the second column in the first row and (ii) the value of the second column in the third row in the view transformation matrix. On the other hand, in the case where the coordinate transformation is executed by multiplying a coordinate with the view transformation matrix from the right side of the coordinate, the view transformation matrix change unit 102d changes, to 0, (i) the value of the first column in the second row and (ii) the value of the third column in the second row in the view transformation matrix. After that, the view transformation unit 102e, using the changed view transformation matrix, transforms and sets the coordinate of the three-dimensional object, from the global coordinate system into the view coordinate system (S205 and S206). In such case as described above, not only each vertex coordinate of the three-dimensional object, but also all of the necessities such as a view coordinate and a light source are arranged in the view coordinate system.

Also, the projection-transformation unit 103a determines a projection-transformation matrix for (a) transforming each vertex coordinate of a three-dimensional object in the view coordinate system, according to the distance from the view coordinate, so that the closer the vertex coordinate is, the larger it becomes, and the farther the vertex coordinate is, the smaller it becomes. The projection-transformation unit 103a also executes a matrix transformation process for transforming the view coordinate into a screen coordinate (S207). In such case as described above, the projection-transformation unit 103a sets a clipping coordinate so as to remove unnecessary line and plane of the object (S208).

Then, the viewport-transformation unit 103b, in order to adjust the three-dimensional object to the display position and size on the actual screen, (i) transforms each coordinate of the three-dimensional object by the viewport-transformation (S209), and (ii) finally sets a screen coordinate which is a coordinate on the screen of the map display apparatus (S210).

Figure 9:
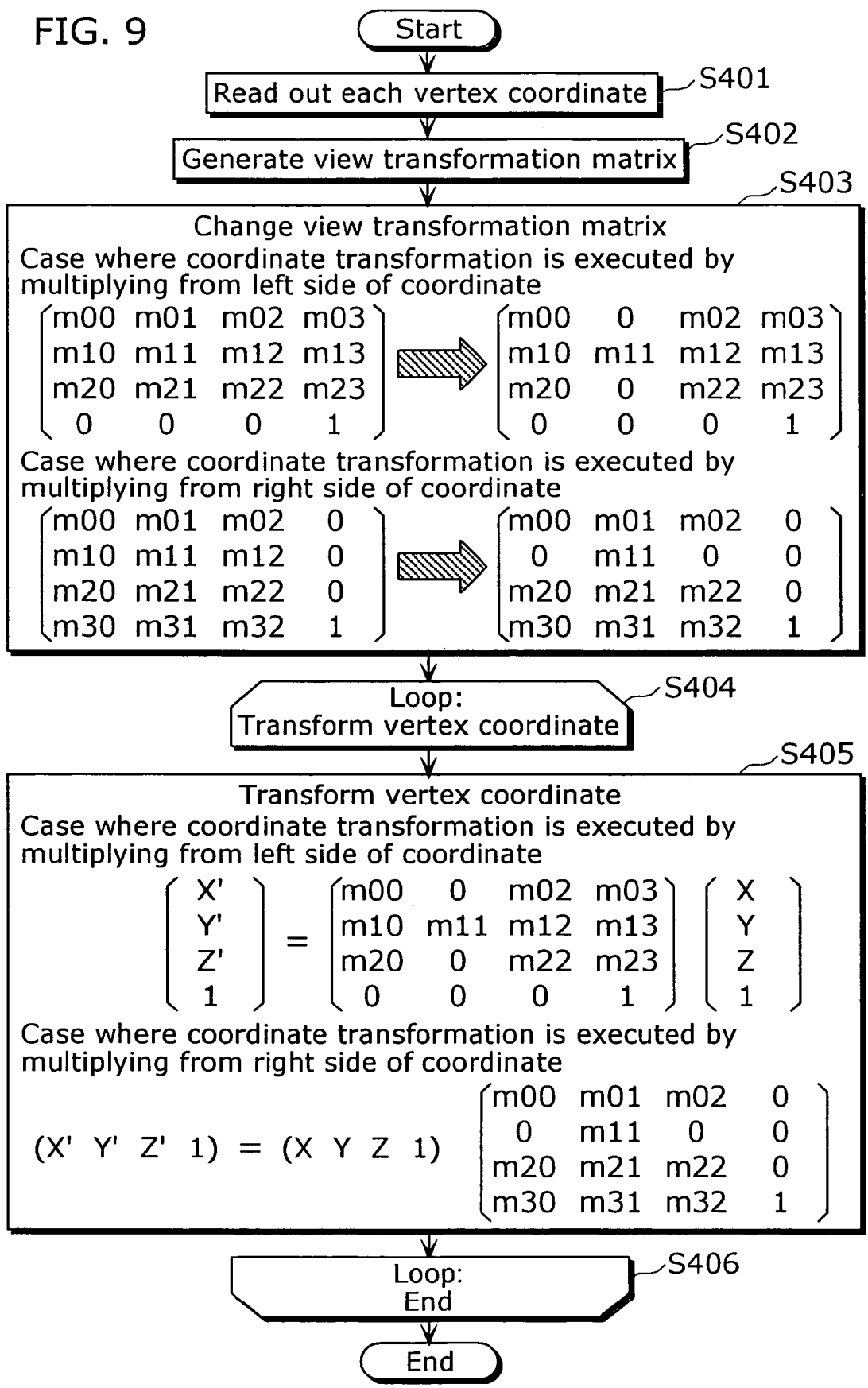
FIG. 9 is a flow chart showing the specific procedures of a change process of a view transformation matrix and a transformation process from a global coordinate system into a view transformation system.

FIG. 9 is a flow chart showing specific procedures of a change process of a view transformation matrix and a transformation process from a global coordinate system into a view coordinate system in the map display apparatus according to the present embodiment (S205).

First, the global coordinate of the three-dimensional object set by the local-to-global transformation unit 102b is read out (S401). Next, the view transformation matrix generation unit 102c generates a view transformation matrix based on the global coordinate, a view coordinate and a view direction (S402). The view transformation matrix change unit 102d, for the view transformation matrix, changes (i) the value of the second column in the first row and (ii) the value of the second column in the third row in the view transformation matrix so that the "x" coordinate and the "z" coordinate after transformation should not change due to the "y" coordinate of the global coordinate system (S403).

Next, the view transformation unit 102e executes transformation process on each read-out vertex coordinate of the three-dimensional object (S404). Due to the changed view transformation matrix, each vertex coordinate of the three-dimensional object is transformed so that the value of the "x" coordinate and the value of the "z" coordinate after transformation should not be affected by the "y" coordinate. Then, since the component regarding the "y" coordinate remains (the second row) as a regular view transformation matrix, a regular view transformation is executed on the "y" coordinate (S405).

Then, after the change process is finished for each vertex coordinate, the view transformation unit 102e finishes the loop (S406).

Figure 1A:
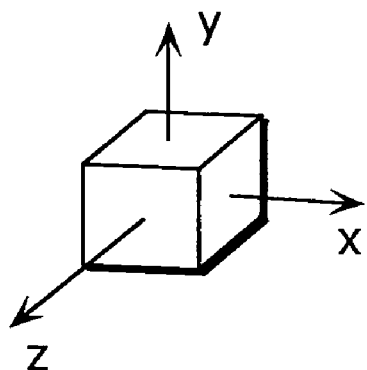
FIG. 1A, FIG. 1B and FIG. 1C are schematic diagrams showing three-dimensional coordinate systems.
Figure 1B:
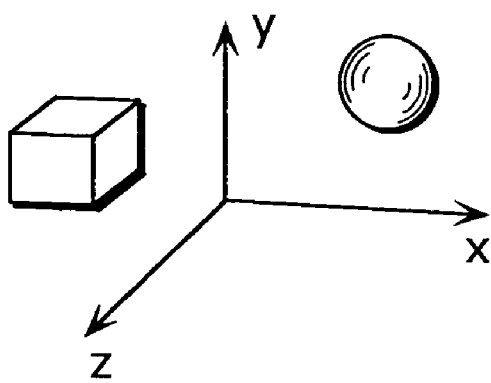
Figure 1C:
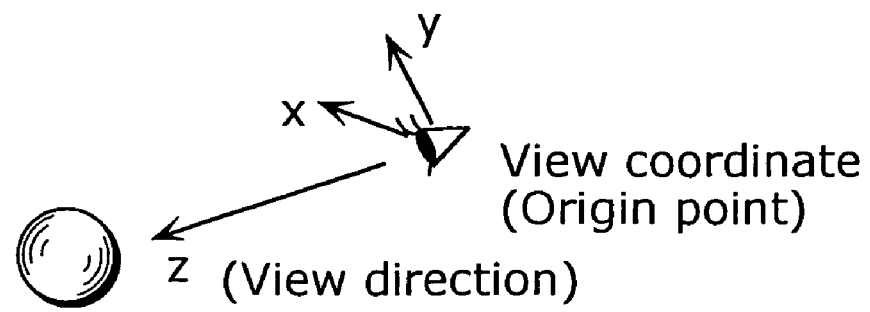
Figure 2A:
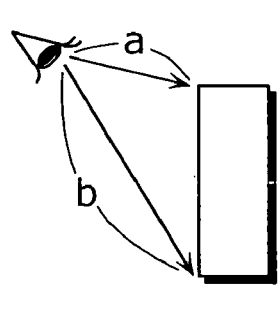
FIG. 2A, FIG. 2B and FIG. 2C are schematic diagrams for illustrating a perspective distortion.
Figure 2B:
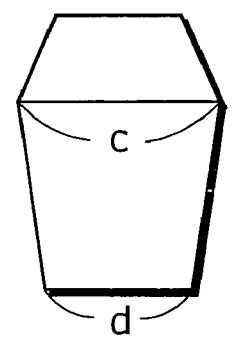
Figure 2C:
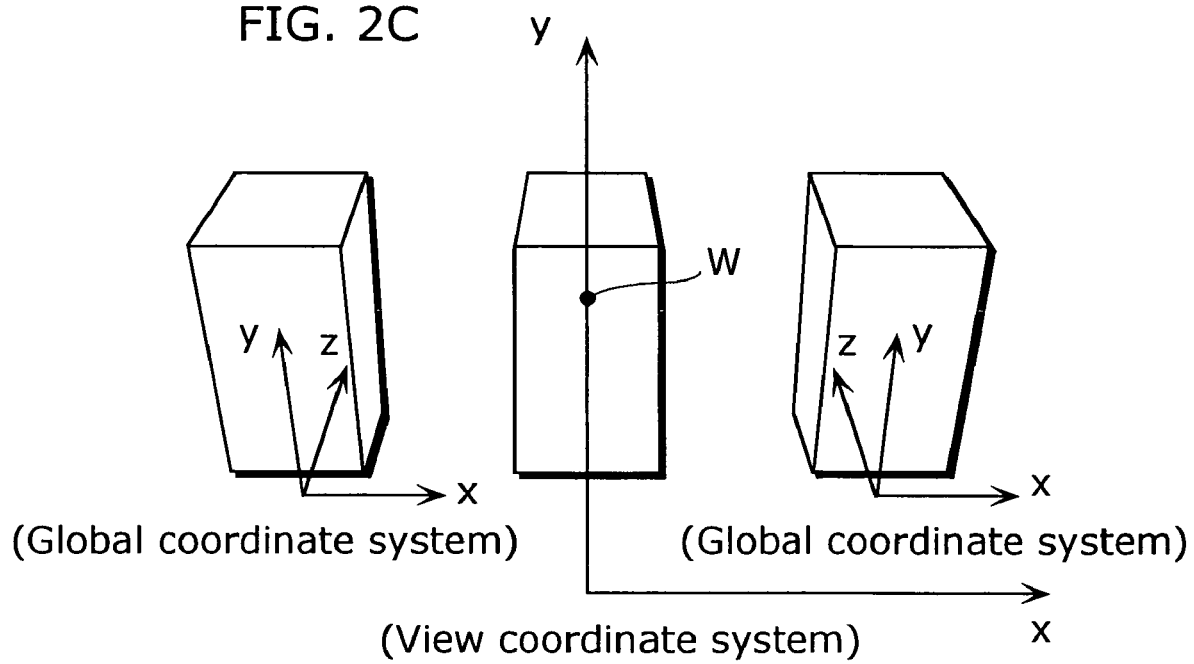
Figure 3A:
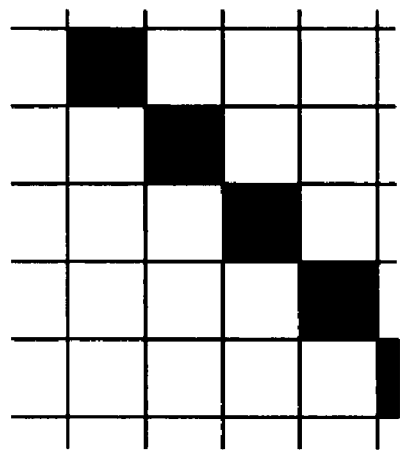
FIG. 3A, FIG. 3B and FIG. 3C are schematic diagrams respectively showing a border line of a three-dimensional object (building) in vertical direction.
Figure 3B:
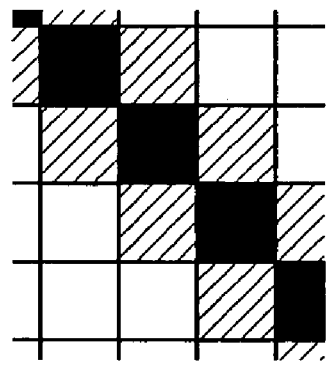
Figure 3C:
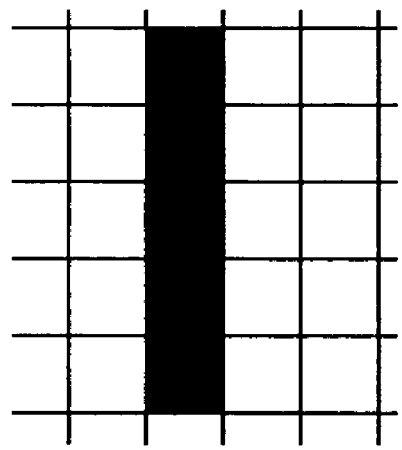
Figure 4A:
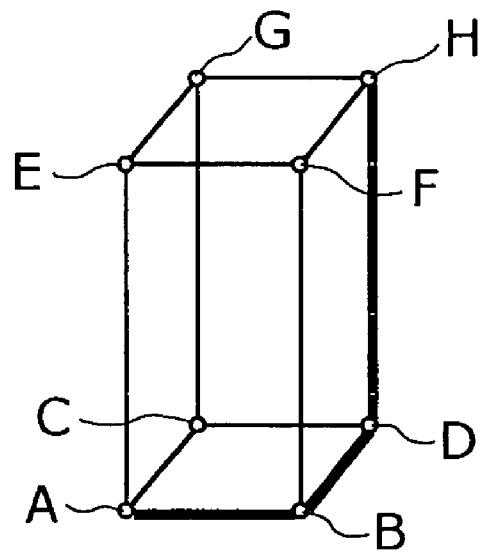
FIG. 4A and FIG. 4B are illustrations of the methods for displaying a three-dimensional object on the screen.
Figure 4B:
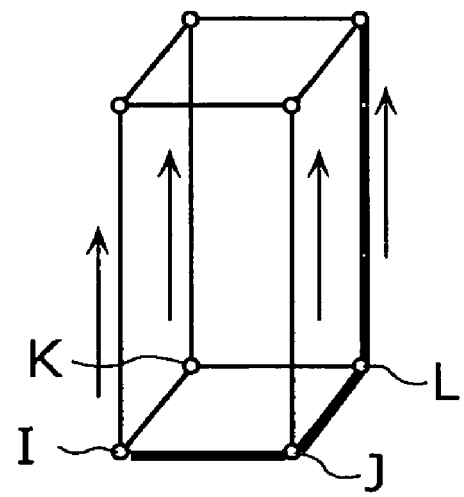
Figure 5A:
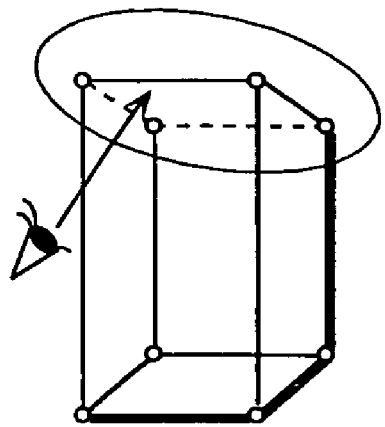
FIG. 5A and FIG. 5B are schematic diagrams showing display examples according to each display method.
Figure 5B:
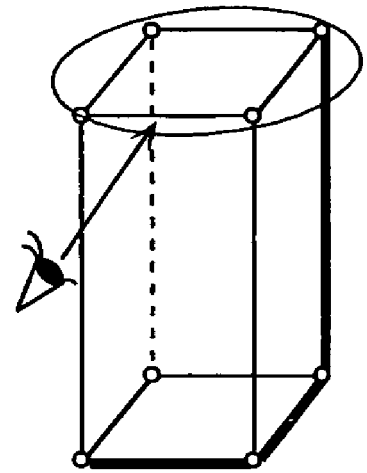
Figure 10:
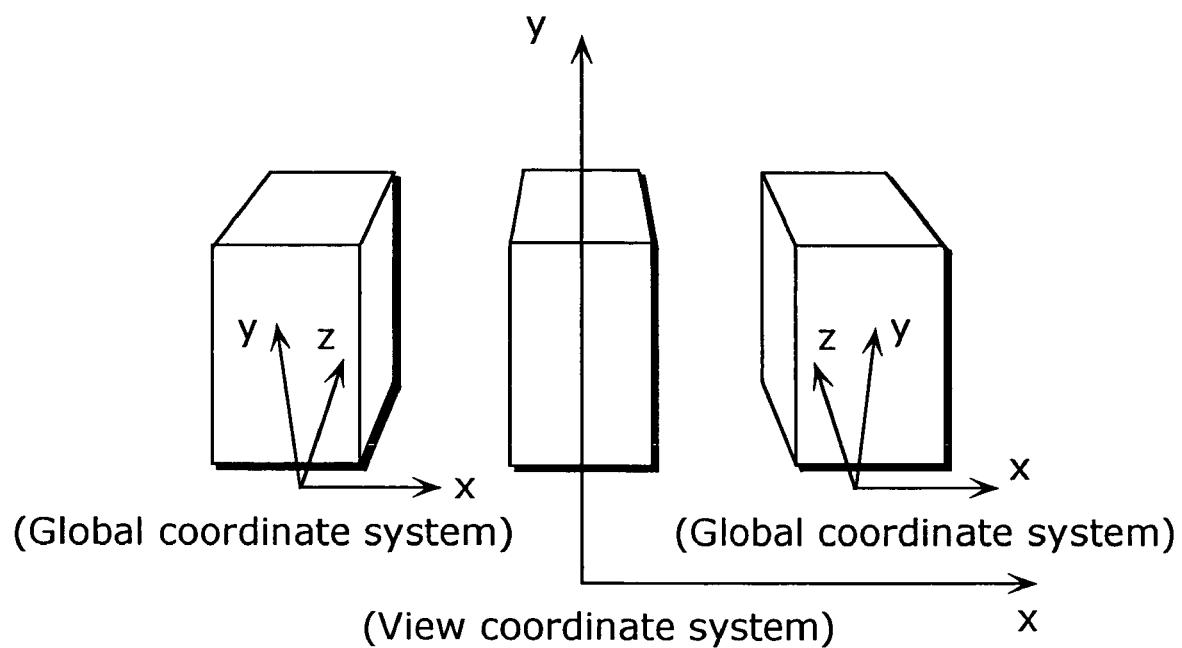
FIG. 10 is a display example of the screen of the map display apparatus according to the first embodiment of the present invention.

FIG. 10 is a display example of the screen of the map display apparatus according to the present embodiment. As shown in FIG. 2C, according to the conventional map display, the farther a building exists from the view line, the more leaned the building is rendered. Thus, the border line of the vertical direction of the building is leaned, and jaggies appear. On the other hand, according to the present embodiment, as shown in FIG. 10, as the building is rendered straight in the "y" axis direction of the screen, the building can be displayed beautifully without jaggies.

As described above, after the view transformation matrix for transforming the coordinate of the three-dimensional object from the global coordinate system into the view coordinate system is changed, the transformation process from the global coordinate system into the view coordinate system is executed. Thus, while data regarding the horizontal direction ("x" axis direction) and the depth ("z" axis direction) of the map screen is correctly retained, the data regarding the vertical direction ("y" axis direction) can be corrected, and the building which exists on the screen end can be displayed straight in the screen vertical direction. Therefore, jaggies do not appear, and the building can be beautifully displayed.

According to the present embodiment, in the view transformation matrix change unit 102d, the view transformation matrix is always changed. However, the above mentioned change of the view transformation matrix is not mandatory. For example, a configuration comprising a selecting unit for selecting whether or not to change the view transformation matrix is conceivable. Thereby, it is possible to select, according to need, a display including a regular perspective distortion or a display displaying a three-dimensional object straight in the vertical direction of the screen.

Moreover, according to the present embodiment, the example of the map display apparatus which operates independently has been explained, but there are other cases as well. For example, by setting a communication unit between the configuration of the above mentioned map display apparatus and the terminal apparatus such as a Personal Digital Assistant (PDA) and a cellular phone, the three-dimensional map image data transformed into a screen coordinate system can be transmitted to the terminal apparatus, and a three-dimensional map can be displayed on the screen of the terminal apparatus.

Second Embodiment

According to the second embodiment, the case of determining whether or not to execute a correction for each building, based on the display correction flag included in map data, and displaying will be explained. As the configuration of the present embodiment is the same as the configuration of the first embodiment, the present embodiment will be explained using FIG. 6. An explanation for the same parts as the first embodiment will be omitted.

The differences of the second embodiment from the first embodiment are: the three-dimensional building data stored in the map data storage unit 101; and the operation of the view transformation matrix change unit 102d. The rest of the configuration is the same as the first embodiment.

In the map data storage unit 101, in addition to height H of a building which is a three-dimensional object, vertex number N of a polygonal column shape forming a border rectangle of the building, each vertex coordinate Pi (i=1–N), attributes and the like, three-dimensional building data including a display correction flag which indicates whether or not the view transformation matrix should be changed is stored.

The view transformation matrix change unit 102d judges whether or not the display correction flag indicates changing the view transformation matrix (display correction flag is ON). In the case where the display correction flag indicates ON, the view transformation matrix change unit 102d changes the view transformation matrix. In the case where the display correction flag does not indicate ON, the view transformation matrix change unit 102d does not change the view transformation matrix.

FIG. 11 is a flow chart showing the procedures of the change process of the view transformation matrix and the transformation process from the global coordinate system to the view coordinate system, in the case of using the display correction flag, in the map display apparatus according to the present embodiment. Here, the explanation is simplified compared to the explanation for the first embodiment using FIG. 9.

The view transformation matrix generation unit 102c generates a view transformation matrix, based on the global coordinate, the view coordinate and the view direction (S501). Next, the view transformation matrix change unit 102d judges whether or not the display correction flag of the three-dimensional flag indicates ON (S502). As a result, in the case where the display correction flag indicates ON (YES in S502), the view transformation matrix change unit 102d changes the view transformation matrix (S503). In other words, the view transformation matrix change unit 102d, for the view transformation matrix, changes, to 0, (i) the value of the second column in the first row and (ii) the value of the second column in the third row in the view transformation matrix so that the "x" coordinate and the "z" coordinate after transformation do not change due to the "y" coordinate of the global coordinate system.

Next, the view transformation unit 102e executes a transformation process on each vertex coordinate of the three-dimensional object read out using the changed view transformation matrix (S504). Thus, in such case as described above, each vertex coordinate of the three-dimensional object is transformed so that the value of the "x" coordinate and the value of the "z" coordinate after transformation should not be affected by the "y" coordinate of the global coordinate system.

On the other hand, in the case where the display correction flag does not indicate ON (NO in S502), the view transformation matrix change unit 102d does not change the view transformation matrix, and the view transformation unit 102e executes a transformation process on each vertex coordinate of the three-dimensional object read out using a regular view transformation matrix which has not been changed (S504). Thus, in such case described above, a regular view transformation is executed.

As described above, whether or not to change the view transformation matrix for transforming the coordinate of a building (three-dimensional object), from the global coordinate system into the view coordinate system is determined for each building based on the display correction flag. Thus, a correction can be executed for each building, according to need, and only the buildings which need to be displayed straight can be displayed straight in the screen vertical direction.

According to the present embodiment, in the view transformation matrix change unit 102*d*, whether or not to execute a correction for each building is determined based on the display correction flag, but there are other cases as well. For example, a configuration comprising a selection unit for selecting one of (i) not executing correction for all, (ii) determining whether or not to execute a correction for each building, based on the display correction flag, or (iii) executing corrections for all. Thus, it is possible to select, according to need, from (i) a display including a regular perspective distortion, (ii) a display displaying each building straight in the vertical direction of the screen based on the display correction flag, and (iii) a display displaying all of the three-dimensional objects straight in the vertical direction of the screen.

Moreover, the present embodiment has the configuration in which a display correction flag is held for each building, and whether or not a correction is executed for each building is determined based on the display correction flag, but there are other cases as well. For example, a configuration which has the display correction flag for each building block including a plurality of buildings is conceivable, and whether or not a correction is executed for each building block may be determined based on the display correction flag.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

As described above, the map display apparatus according to the present invention can beautifully display a building which is a three-dimensional object, and is useful for, for example, displaying a three-dimensional map on the screen of a car navigation apparatus, a PDA, a cellular phone and the like.

What is claimed is:

1. A map display apparatus for displaying a three-dimensional map on a screen, based on map data including data regarding a three-dimensional object,
    wherein the map data includes a display correction flag indicating whether or not to execute a correction so that a line of the three-dimensional object in a vertical direction is vertical, when the three-dimensional object is displayed on the screen, and
    wherein the map display apparatus comprises:
    a correction unit operable to execute, in the case where the display correction flag indicates that the correction should be executed, a correction on a first lean, on the screen, occurring in a line in the vertical direction of the three-dimensional object so that the line in the vertical direction of the three-dimensional object is displayed vertically on the screen while keeping a tilted second lean to be displayed on the screen, the second lean occurring in a line in a horizontal direction of the three-dimensional object, and the first lean and the second lean being a perspective distortion occurring due to a perspective difference between objects from a viewpoint position; and
    a selection unit operable to select one of (i) "always execute a correction" in said correction unit, (ii) "execute a correction based on the display correction flag" in said correction unit, and (iii) "never execute a correction" in said correction unit,
    wherein in the case where (i) "always execute a correction" is selected by said selection unit, said correction unit executes the correction on the three-dimensional object regardless of the display correction flag,
    wherein in the case where (ii) "execute a correction based on the display correction flag" is selected by said selection unit, said correction unit executes the correction on the three-dimensional object based on the display correction flag, and
    wherein in the case where (iii) "never execute a correction" is selected by said selection unit, said correction unit does not execute the correction on the three-dimensional object.

2. The map display apparatus according to claim 1,
    wherein the display correction flag is included in the three-dimensional object, and
    wherein said correction unit executes the correction of the corresponding three-dimensional object based on the display correction flag.

3. The map display apparatus according to claim 1,
    wherein the display correction flag is shared by a plurality of the three-dimensional objects, and
    wherein said correction unit executes the correction of a corresponding at least one of the three-dimensional objects based on the display correction flag.

4. The map display apparatus according to claim 1, further comprising:
    an object generation unit operable to execute a generation process of the three-dimensional object by specifying a local coordinate of each vertex of the three-dimensional object, based on the map data;
    a local-to-global transformation unit operable to transform the local coordinate of the three-dimensional object into a global coordinate;
    a view transformation matrix generation unit operable to (i) specify a view coordinate of a viewpoint on the global coordinate, and (ii) generate a view transformation matrix for transforming the global coordinate into a view coordinate system whose origin point is the view coordinate;
    a view transformation unit operable to transform the global coordinate into the view coordinate system, using the view transformation matrix; and
    a rendering unit operable to (i) projection-transform, the coordinate which has been transformed into the view coordinate system, into a screen coordinate system which is a two-dimensional coordinate system, and (ii) adjust the projection-transformed coordinate to a final display area of a proper size on the screen,
    wherein said correction unit changes a view transformation matrix generated by said view transformation matrix generation unit to execute the correction on the first lean, on the screen, occurring in the line in the vertical direction of the three-dimensional object so that the line in the vertical direction of the three-dimensional object is displayed vertically on the screen while keeping the tilted second lean, and wherein said view transformation unit transforms the global coordinate into the view coordinate system, using the view transformation matrix changed by said correction unit.

5. The map display apparatus according to claim 4, wherein said correction unit sets, to zero, an element to be multiplied to a value of a "y" coordinate which is a value in a vertical direction in a global coordinate system, from among elements which are included in the view transformation matrix generated by said view transformation matrix generation unit and are used for deriving a value of an "x" coordinate and a value of a "z" coordinate in the view coordinate system.

6. The map display apparatus according to claim 5, wherein the view transformation matrix is a transformation matrix including four rows and four columns, and wherein said correction unit changes, to 0, (i) a value of a first row in a second column and (ii) a value of a third row in a second column in the view transformation matrix, in the case where a coordinate transformation is executed by multiplying a coordinate with the view transformation matrix from a left side of the coordinate.

7. The map display apparatus according to claim 5, wherein the view transformation matrix is a transformation matrix including four rows and four columns, and wherein said correction unit changes, to 0, (i) a value of a second row in a first column and (ii) a value of a second row in a third column in the view transformation matrix, in the case where a coordinate transformation is executed by multiplying a coordinate with the view transformation matrix from a right side of the coordinate.

* * * * *